United States Patent [19]

Jerman

[11] Patent Number: 5,116,457

[45] Date of Patent: May 26, 1992

[54] SEMICONDUCTOR TRANSDUCER OR ACTUATOR UTILIZING CORRUGATED SUPPORTS

[75] Inventor: John H. Jerman, Palo Alto, Calif.

[73] Assignee: I C Sensors, Inc., Milpitas, Calif.

[21] Appl. No.: 753,607

[22] Filed: Aug. 30, 1991

Related U.S. Application Data

[62] Division of Ser. No. 335,185, Apr. 7, 1989, Pat. No. 5,064,165.

[51] Int. Cl.$^5$ .............. H01L 21/306; B44C 1/22; C03C 15/00; C03C 25/06
[52] U.S. Cl. ................... 156/628; 29/621.1; 156/651; 156/657; 156/659.1; 156/661.1; 156/662
[58] Field of Search ............... 156/628, 647, 648, 651, 156/657, 659.1, 661.1, 662; 29/6231.1, 25.35

[56] References Cited

U.S. PATENT DOCUMENTS

| | | | |
|---|---|---|---|
| 4,685,996 | 8/1989 | Busta | 156/628 |
| 4,981,552 | 1/1991 | Mikkor | 156/647 |
| 5,024,953 | 6/1991 | Uematsu et al. | 156/647 X |
| 5,045,152 | 9/1991 | Sickafus | 156/653 |

*Primary Examiner*—William A. Powell
*Attorney, Agent, or Firm*—Fitch, Even, Tabin & Flannery

[57] ABSTRACT

A semiconductor transducer or acutator is disclosed. The transducer and actuator each include a deflecting member with corrugations producing increased vertical travel which is a linear function of applied force. An accurate and easily controlled method that is insensitive to front-to-back alignment is also disclosed for forming uniform corrugations of precise thickness; independent of the thickness of the deflecting member. The cross-sectional shape of the corrugations is not limited by the etching technique, so that any configuation thereof is enabled.

25 Claims, 4 Drawing Sheets

SEMICONDUCTOR TRANSDUCER OR ACTUATOR UTILIZING CORRUGATED SUPPORTS

This is a division of application Ser. No. 07/335,185, filed Apr. 7, 1989, U.S. Pat. No. 5,064,165.

FIELD OF THE INVENTION

This invention relates to semiconductor transducers and actuators having a deflecting member and more particularly to a transducer and an actuator utilizing corrugations in the supports of the deflecting member.

BACKGROUND OF THE INVENTION

Typical diaphragm-type transducers and actuators employ a thin diaphragm of a circular, square or rectangular plan configuration. When this diaphragm is subjected to a force, the deflection of the diaphragm reflects the magnitude of this force. It is well known that the deflection of such a diaphragm is linear with applied force or pressure so long as the deflection is a small fraction of the thickness of the diaphragm. As the force or pressure is increased beyond this point, the deflection becomes a non-linear function of the applied force or pressure due to the stretching of the diaphragm. In many applications this non-linear travel limits the useful range of the device. Flat deflecting beams that stretch when subjected to an applied force or pressure have a similar problem. These diaphragms or beams are typically used as the movable element in pressure transducers and actuators, but can also be used in accelerometers, force transducers, or displacement transducers.

As diaphragms are made thinner, the above-mentioned non-linear deflection characteristic of the diaphragm is exacerbated. Hence, typically, to provide a low pressure transducer or actuator having a satisfactory linear operating range requires that the diaphragm be larger. This is unacceptable for many applications where there are size constraints. For example, it is important that pressure transducers formed using semiconductor materials be as small as possible.

Another problem arises when a flat diaphragm which is clamped at its edges, is subjected to a differential pressure. The central region of the diaphragm is bent into a curved shape rather than moving up and down in a piston-like manner. If, as typically is the case, the measurement of the deflection of the diaphragm is done by capacitor plates attached with one plate on the diaphragm and a second plate on a surface opposite the diaphragm, the measurement will be complicated because the shape of the diaphragm plate changes with applied force or pressure. Further, it is known that a relatively large movement of the diaphragm is advantageous when measuring the deflection by capacitive means since the change in capacitance is related to the reciprocal of the gap between the plates of the capacitor. For very sensitive flat diaphragms, the linear deflection is only a small fraction of the thickness of the diaphragm. This requires that the capacitor plates be positioned with a gap having a width which is also a fraction of the diaphragm thickness. Achieving such a small capacitor gap can greatly complicate the assembly of such a structure. If the small gap cannot be realized, the change in capacitance for a given applied force or pressure will be severely limited.

It is known that corrugated diaphragms provide certain advantages over flat diaphragms when utilized in a pressure transducer. For purposes of this specification, what is meant by a corrugation is a structure having one or more grooves separated by a thin section that allows compliant movement. For corrugated diaphragms, the compliance in the grooves substitutes for the stretching that would occur in flat diaphragms. The primary advantage of a corrugated diaphragm is that there is a more linear vertical travel per unit of applied force. For example, it is taught in *Flat and Corrugated Diaphragm Design Hanbook* by Marco Di Giovanni (published by Marcel Dekker, Inc.) that a diaphragm of similar sensitivity and diameter will have more linear range and stiffness if it has a corrugated support rather than a flat support. Hence, corrugated diaphragms are utilized advatageously to increase the range of linear travel of the transducer as a function of applied force.

Therefore, in order to alleviate diaphragm non-linearity due to stretching, metallic structures have been used wherein the diaphragm is formed with corrugations. Corrugated diaphragms of this type have been found to exhibit a larger range of linear deflection to applied pressure, thereby minimizing the stretching effect. Typically, such diaphragms are used in conjunction with a push rod and beam to form a relatively complex pressure responsive mechanism. A problem with such diaphragms is that they must be machined or formed from suitable metals and are difficult to manufacture. Furthermore, the strain sensors located thereon need to be separately positioned and mounted on these corrugated structures, resulting in additional problems which affect performance within the linear range.

The above-described manufacturing and performance problems of corrugated diaphragm sensors are minimized if semiconductors processing techniques can be used. U.S. Pat. No. 4,467,656 to Mallon, et al. teaches that a convoluted diaphragm can be formed in silicon. Piezoresistive devices are diffused into the convolutions using integrated circuit methods. The result is a pressure transducer that can be fabricated from a silicon substrate by etching concentric recesses or corrugations on both sides of the substrate. The corrugations are surrounded by a rigid peripheral area.

U.S. Pat. application No. 4,236,137 to Kurtz et al. discloses a pressure transducer having a semiconductor diaphragm with a central boss area of trapezoidal cross-section surrounded by a continuous groove. A plurality of piezoresistive sensors are formed on the diaphragm with a first sensor adjacent to the outer edge of the groove and a second sensor parallel to the first sensor and being adjacent to the inner edge of the groove. The groove is operative as a stress concentrating area for the sensors. It is known, however, that a single groove does not substantially improve the linearity of diaphragm travel over that of a flat diaphragm structure. Therefore, although this structure is useful in some applications for edge stress measurement, it would not be effective in many applications for the same reasons that flat diaphragms are not effective.

In many transducer applications, such as in accelerometers, it is necessary to measure the force perpendicular to the plane of the diaphragm. The accelerometer typically has a centrally positioned deflecting member that deflects in response to an applied force, the vertical travel of the deflecting member being a measure of the applied force.

A key problem with previous transducers utilizing corrugations is that there are stress points located within the corrugations that can adversely affect the operation of the transducer. It is known that corrugations formed by anisotropic etch techniques are trapezoidal in shape and that the trapezoidal corrugations will have stress concentrated in the corners of the corrugations. Hence, if an excessive amount of pressure is applied to the transducer, the corrugations may crack at those corners, rendering the transducer inoperative.

Mallon, et al., notes that isotropic etching could be used to provide a rounded configuration, but does not disclose how to achieve such a structure. In fact, Mallon, et al. teaches that the anisotropic etch is preferred and the stress problem caused by these types of corrugations is not addressed. It is well known that conventional isotropic etch techniques are difficult to control and the corrugations produces utilizing isotropic etch techniques may not be uniform, thereby causing stress to be still concentrated therewithin.

It is also known that producing corrugations utilizing known processing methods can be very difficult when thin diaphragms are formed for low pressure measurements. In a typical process, each side of a silicon material is masked utilizing typical photolithography techniques and then each side is etched into the desired pattern. This process typically requires precision alignment instruments to ensure that front and back surfaces match. If the surfaces do not match, then the resultant corrugations will not be properly formed, which seriously affects the performance of the transducers. In particular, when thin structures are formed (on the order of 0.5 $\mu$m to 10 $\mu$m), then misalignment becomes very significant, often to the point of rendering the transducer inoperative.

A final related problem with corrugated diaphragm structures is that the depth of the corrugations and the thickness of the deflecting member each affect the deflection charcteristics of the structure. When the corrugated diaphragm structure is produced via the above procedure, then the deflecting member must be masked with the corrugations. In the resultant structure the corrugations can only be the same thickness as the deflecting member. Therefore, since the corrugation and deflecting member thicknesses are related, the dimensions of the transducer formed by these processes are limited by that dependence.

Accordingly, it is a principal object of the present invention to provide a semiconductor transducer or a semiconductor actuator that has increased linearity of travel per unit of applied force or pressure.

It is another object of the present invention to provide a method for producing a corrugated structure to be utilized with a transducer or actuator that overcomes some of the fabrication problems associated with known semiconductor processing techniques.

It is yet another object of the present invention to provide a semiconductor transducer or a semiconductor actuator which overcomes some of the problems associated with previous diaphragm transducer or actuator assemblies.

It is a further object of the present invention to enable corrugation formation to be less dependent on front-to-back alignment of the semiconductor starting material.

It is still a further object of the present invention to provide a transducer or an actuator which maximizes the deflection for a given applied force or pressure.

It is yet a further object of the present invention to provide an improved method for forming a semiconductor transducer or a semiconductor actuator which allows the predetermined thickness of the deflecting member to be independent of the predetermined thickness of the corrugations.

SUMMARY OF THE INVENTION

In a first aspect of the present invention, an improved semiconductor transducer is disclosed. The transducer comprises a semiconductor layer having a centrally positioned, rigid deflecting member, a support member and a plurality of corrugations coupled between the deflecting member and a support member. The transducer also includes means for sensing the deflection of said deflecting member and for developing an electrical signal as a function of the sensed deflection of said deflecting member. The corrugations provide for increased linear vertical travel of the deflecting member per unit of applied force than for similar flat semiconductor transducers.

In a second aspect of the present invention, an improved semiconductor actuator is disclosed. The actuator comprises a semiconductor layer having a centrally positioned, rigid deflecting member, a support member and a plurality of corrugations coupled between the deflecting member and the support member. The actuator also includes means for applying a force to the deflecting member and for utilizing that deflection in conjunction with a separate structure, device, or physical medium. The corrugations provide for increased vertical travel of the deflecting member compared to flat diaphragms of similar size, thus allowing for greater effect on the affected structure, device, or medium.

In another apsect of the present invention, a method for forming corrugations in a semiconductor material is disclosed. The method comprises the steps of masking a first surface on said semiconductor material in accordance with a predetermined pattern, etching said surface in accordance with the pattern to provide a predetermined profile on the surface, removing the mask from the surface, providing an etch stop on the first surface in accordance with the predetermined profile and etching a surface opposite the first surface to the etch stop to form the corrugations.

By utilizing this procedure, a semiconductor transducer or actuator is produced that is less susceptible to stress concentrations than previous corrugated structures. In addition, due to the etch stop procedure, there is no need for alignment of the structure to provide for front-to-back orientation. This method also allows for the deflecting member thickness to be independent of the corrugation thickness. Finally, the method of the present invention is substantially easier to control than previous methods and has increased utility in manufacturing processes.

DETAILED DESCRIPTION OF THE INVENTION

It is known that flat (meaning non-corrugated) semiconductor diaphragms have displacements that are non-linear functions of the applied force or pressure. Hence, flat diaphragms must be down-rated or their overall range of linear displacement must be reduced to maintain a linear response at low pressures. Therefore, flat diaphragms are generally unsuitable for low pressure measurements.

Figure 1:
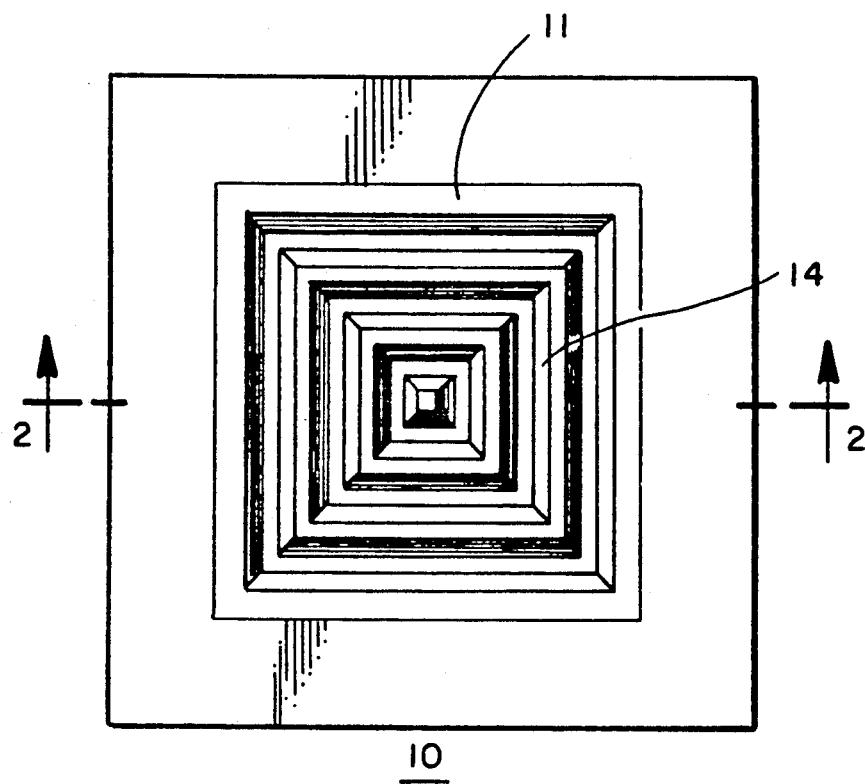
FIG. 1 is a top plan view of a prior art semiconductor transducer.
Figure 2:
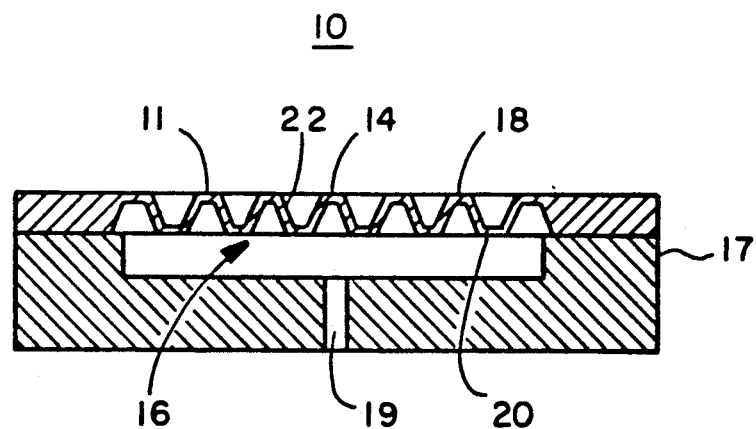
FIG. 2 is a cross-sectional side view of the prior art semiconductor transducer of FIG. 1.

As mentioned, corrugated diaphragm structures have been utilized in semiconductor device for measuring edge stress. FIGS. 1 and 2 exemplify this type of diaphragm structure.

FIG. 1 is a top plan view of a prior art pressure trnasducer 10 employing a corrugated diaphragm 11. Diaphragm 11 is shown relatively square, but other configurations can be employed. Diaphragm 11 can be fabricated from, for example, single-crystal silicon. The surface of diaphragm 11 contains a series of concentric grooves or corrugations 14 of increasing size which form squares in the plan view.

FIG. 2 is a cross-sectional side view of pressure transducer 10 of FIG. 1 through section 2—2. Pressure transducer 10 may be mounted on a support member 17 which is bonded about the periphery of the diaphragm 11 by means of glass bonding or the like. Support member 17 may be fabricated from silicon, metal or glass and has an aperture 19 which serves as a pressure port.

As can be seen, corrugations 14 of diaphragm 11 are trapezoidal in cross-section, forming crests and valleys shown generally at 18 and 20. The central area of diaphragm 11, designated generally at 16, is corrugated and has a given thickness. Each corrugation 14 is formed by an anisotropic etch which produces the sloping sidewalls 22.

Pressure transducer 10 of FIGS. 1 and 2 is utilized to measure edge stress at its outer edge. Typically, piezoresistive sensors are placed on an edge of transducer 10 providing a measure of the level of applied force by producing an electrical signal in response to a change in stress. The linear travel of corrugations 14 is greater than that of flat diaphragms, but pressure transducer 10 is not suitable for certain applications.

A problem with the above-mentioned prior art structure is that center deflections are measured indirectly with piezoresistive elements at the periphery of the diaphragm. Piezoresistive sensing is not optimum for many applications because (1) there are large changes in sensitivity with temperature, (2) there are errors from leakage currents from the resistive elements, and (3) typical changes in stress produce small changes in resistance which must be accurately detected. Hence, for many applications, a structure which does not require piezoresistive elements would be desirable.

Another problem with known corrugated pressure transducers is that precise front-to-back groove alignment is required and this is difficult to achieve. In a typical process, photolithographic masks are deposited on both sides of the starting material. Then both sides are etched until the structure is formed. At this step, it is crucial that the front and back side masks match to ensure that the corrugation formed has the proper configuration. As the corrugation thickness decreases, this alignment of the front and back of the diaphragm becomes increasingly important. In low pressure transducers, the thickness of the corrugations is usually between 0.3 $\mu$m and 20 $\mu$m.

At these thicknessess, even minor misalignment of the front and back sides of the mask would render the transducer inoperative. Hence, considerable time and expense is required in aligning the material which significantly increases manufacturing costs, which in turn may prohibit commercial viability.

In addition, as mentioned, in prior art fabrication, the thicknesses of the deflecting member and the corrugations are dependent upon each other. This inhibits the use of materials and fabrication processes.

Another problem with prior art corrugated pressure transducers is that the interior corners of the anisotropically etched grooves etch away very quickly. This is described in Bean, K.E., "Anisotropic Etching of Silicon", IEEE Transactions on Electron Devices, Vol. ED-25, No. 10; October 1978, pp. 1185-1193. This means that the masks used to produce the etched grooves must include corner compensation means which are difficult to control and which greatly complicate the fabrication process. For instance, if the corner compensation is only very slightly larger than the optimum, the diaphragm will be substantially thicker in the corner regions. This will increase the stiffness of the diaphragms and concentrate stress in the structure. If the compensation is very slightly smaller than optimum, the diaphragm will etch through in the corners resulting in a hole in the diaphragm and thereby rendering the whole structure inoperative.

Prior art fabrication processes of corrugated pressure transducers also are not able to precisely control diaphragm thicknesses. For example, the thickness in the top 18 of the trapezoid of diaphragm 11 (FIG. 2) is set by the etch rate of the etchant, the time in the etchant, and the thickness of the starting wafer. Prior art processes are adequate for thicknesses to approximately 5% of the depth of the etched groove. It is desirable to provide diaphragms which are as thin as 0.5 $\mu$m and this limits the thickness of the starting material to approximately 10 $\mu$m. Wafers of this thickness cannot be practically processed using conventional methods.

Although corrugations have been discussed primarily in the context of utilization in a diaphragm in a pressure transducer, it is understood that there are other microminiature mechanical devices formed in semiconductor materials in which corrugations would also have utility. For example, U.S. Pat. No. 4,543,457 assigned to Transensory Devices, Inc., describes a beam utilized in a semiconductor apparatus which bends in response to pressure.

Figure 3:
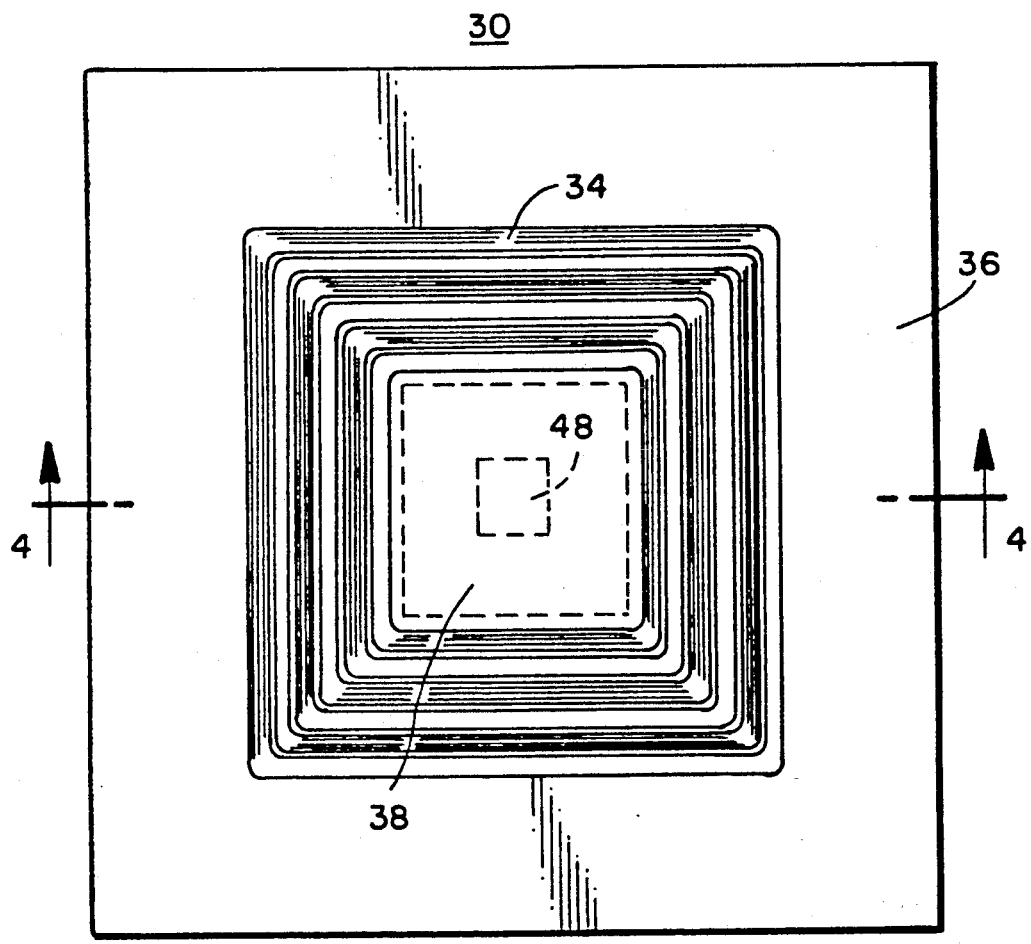
FIG. 3 is a top plan view of a diaphragm semiconductor transducer according to the present invention.

FIG. 3 is a top plan view of a first embodiment of a transducer 30 in accordance with the present invention. Transducer 30 has a substantially square configuration, but rectangular, circular or other configurations such as arcs, spirals, serpentines, and radials are also within the scope of the present invention. Typically, transducer 30 is constructed from a silicon material. However, one of ordinary skill in the art will recognized that there are a variety of other types of materials that could be used. For example, in the present invention, the diaphragm of transducer 30 can be composed of sputtered or evaporated metal, plated metal, vapor-deposited dielectrics such as silicon dioxide or silicon nitride, polymers such as polyimide or Parylene TM or other materials known in the industry. Various materials are useful in different applications where their properties can be advantageously used to impart desirable characteristics to the device.

Transducer 30 includes a layer 32 of semiconductor material having a centrally positioned, rigid deflecting member 38 surrounded by a plurality of corrugations 34, and a support member 36 coupled to the outer periphery of corrugations 34. In this embodiment layer 32 forms the diaphragm for transducer 30.

Figure 4:
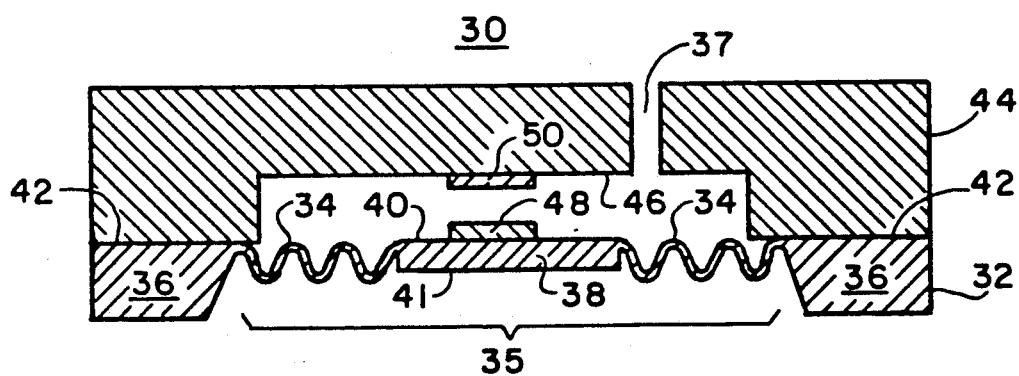
FIG. 4 is a cross-sectional side view of a diaphragm semiconductor transducer according to the present invention.

FIG. 4 is a cross-sectional side view of FIG. 3 through 4—4. As seen in FIG. 4, the transducer 30 according to the present invention is preferably formed from a semiconductor layer 32. Semiconductor layer 32 includes a support member 36 and a diaphragm 35 which in turn comprises a deflecting member 38 and the corrugations 34 on sides of deflecting member 38. The top surface 40 of deflecting member 38 is preferably on the same plane as the top surface 42 of support member 36. The bottom surface 41 of deflecting member 38 is preferably parallel to surface 40. A superstrate 44 having a well 46 formed on a first surface thereof is preferably bonded to surface 42 of support member 36. Sensing means for sensing travel of deflected member 38 includes a sensing element 50 disposed on the first surface of superstrate 44 in well 46 opposite deflecting member 38, and a sensing element 48 disposed on deflecting member 38 oppposite sensing element 50. Sensing means 48, 50 can be any means that senses the movement of deflecting member 38 and produces an electrical signal in response to that movement. In one preferred embodiment, sensing means 48, 50 comprises two capacitive plates. It is understood, however, that sensing means 48, 50 could be any mechanical, optical, or like means which accomplishes the stated purpose. An aperture 37 through superstrate 44 communicates with well 46 to serve as a pressure port.

Corrugations 34 allow deflecting member 38 to move up and down in a piston-like manner for a greater vertical distance than enabled with non-corrugated diaphragms. Thus, the linear relationship between the vertical travel and the applied force holds over a greater distance than that for flat diaphragms. Furthermore, corrugations 34 significantly increase the overall linearity of transducer 30 compared to prior art transducers. For this reason, pressure transducer 30 can be utilized more effectively with capacitive sensors than previously known semiconductor transducers.

Another advantage of the present invention is that corrugations 34 can be formed to have a wide variety of different paths along the plane deferred by surface 40, 42. In transducer 10, as seen in FIG. 1, the paths are generally square with slightly rounded corners, but the paths could be any of a wide variety of possible paths such as circular, spiral, serpentine, radial, or a series of arcs. Such paths have been used in conventional prior art metal diaphragms, but are not possible to make using prior art fabrication methods for semiconductor corrugated diaphragms.

Still another advantage of the present invention is that the corrugations are preferrably curved in cross-section to minimize the stress in the corrugations. The previously mentioned references, particularly Mallon, et al., teach as a preferred method anisotropically etching the silicon material, thereby producing corrugations having a trapezoidal corss-section. Mallon et al. states only that it is possible to isotropically etch a curved pattern, but it is well known that typical isotropic etch techniques are difficult to control and that the corrugations formed thereby may not be uniform in thickness, producing a source of stress which may result in operability.

As also mentioned, in previous methods a crystal of silicon material is masked utilizing well known photolithographic techniques. Then both the front and back sides of the material are anisotropically etched to form the desired corrugated surface. This type of etch creates the sharp corners shown in the corrugations of the transducer of FIG. 2.

If, however, the material is etched utilizing isotropic techniques, then it is harder to control the width and the depth of the corrugations. This leads to a corresponding difficulty in ensuring the uniformity of the corrugations. If the corrugations are not uniform, then there is a strong possibility that stress will be concentrated in certain points, similar to the corrugations formed by anisotropic etchants.

As mentioned, prior art etch techniques also have the problem of being difficult to provide accurate front-to-back alignment. Since the etching takes place on both sides of the material, it is important that each side be aligned with the other. This is difficult because it is impossible to "see" the etch on the opposite side. This is a significant problem when low pressure transducers are formed from semiconductor material. As mentioned, the diaphragms associated with these transducers are very thin (on the order of 0.3 $\mu$m to 20 $\mu$m). The etching process must then be very precise to produce uniform corrugations.

Finally, with prior art processes, the thickness of the support member and deflecting members were directtly related to the thickness of the corrugations. As mentioned, this limited the manufacturability of the transducer.

The present invention provides a process for forming corrugated pressure transducers and actuators which overcome the above-mentioned problems. FIGS. 5A through 5D are simplified cross-sectional views of a process according to the present invention.

Figure 5A:
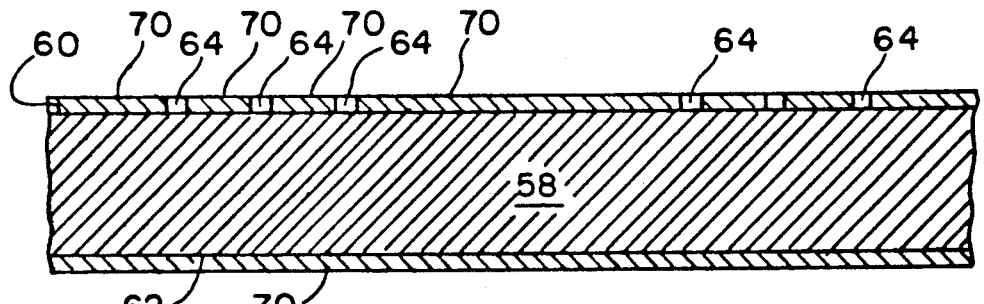
FIG. 5A–D is a simplified diagrammatic view of the method of producing a semiconductor transducer or actuator according to the present invention.

A wafer or layer of silicon 58 comprises starting material to-form a corrugated deflecting member. First, a top surface 60 of layer 58 is masked by depositing either an oxide or a nitride layer 70. A second surface 62 of layer 58 is masked either at this point or later in the same fashion, as described below. Thereafter, as is seen in FIG. 5A, a portion of the layer 70 is removed in the areas where the corrugations are to be etched (shown generally at 64). Then top surface 60 of the silicon material is etched using a standard silicon etching gas, such as sulfur hexafluoride. Typically, this type of etching is done by a conventioanl plasma etch method. Alternatively wet chemical etching can be used. For example, an isotropic etch can be achieved using liquid mixtures of, for example, 90% nitric acid and 10% hydrofluoric acid.

Figure 5B:
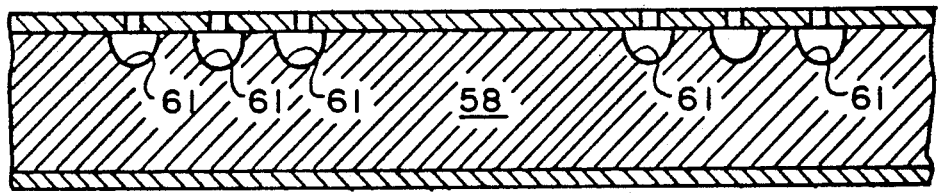

Depending upon the gas pressure and the type of plasma etcher used, the etch profiles can be varied from nearly vertical sidewalls to an isotropic type profile 61, as shown in FIG. 5B. The depth of etched profile 61 is controlled by varying the etching time, the RF power and gas pressure in accordance with standard processing techniques. When an isotropic etch is used, the opening in the etch mask compensates for the amount of undercutting inherent in the isotropic etch process.

Figure 5C:
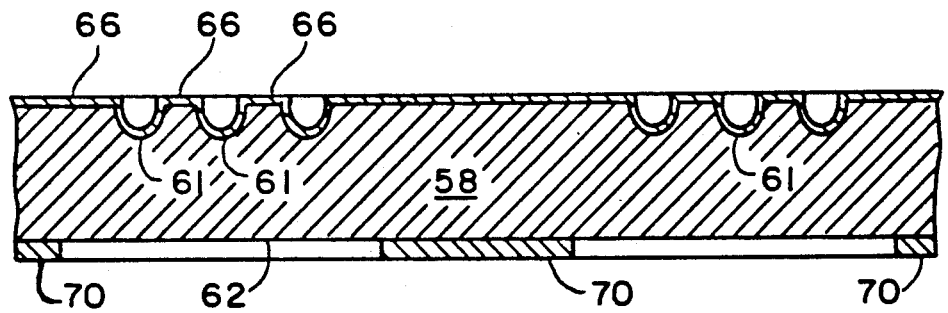

Referring to FIG. 5C, etch mask 70 is then removed from top surface 60. Thereafter, an etch stop 66 is diffused into top surface 60. Etch stop 66 is typically provided by doping top surface 60 with an impurity. One such etch stop is a heavily doped boron region. The thickness of the doped layer can be controlled by using standard predeposition and thermal driving techniques known in the integrated circuit industry. Typically, the doped layers can be made to a depth between 0.3 μm and 20 μm with great accuracy.

Figure 5D:
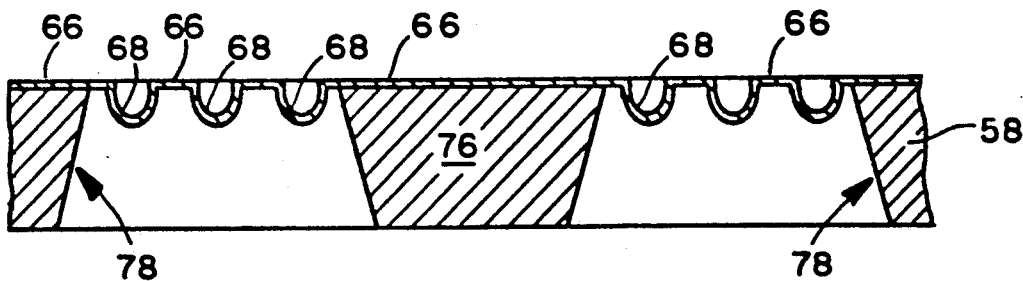

A mask is created in the layer 70 formed on the bottom surface 62 in accordance with a second predetermined pattern. This mask pattern is designed to form a central deflecting member 76, as seen in FIG. 5D, and a support member 78. Bottom surface 62 is then etched to remove the silicon material up to etch stop 66. In so doing, corrugation 68 are created which do not exhibit the previously described deficiencies of prior art corrugations. In this embodiment of the present invention, the etch taken from the bottom surface 62 is an anistropic etch which proceeds until etch stop layer 66 is the only material remaining in the etched region.

A second embodiment of the method of the present invention includes substituting the deposition of a thin film material in place of the inclusion of etch stop 66. This thin film material may be a sputtered or evaporated metal film, a plated metal film, a vapor deposited dielectric film such as silicon dioxide or silicon nitride, a polymer coating such as polyimide or Parylene$^{TM}$, or other materials known in the art. Under appropriate deposition conditions, these films are generally conformal, following the contours of etched grooves 61 to form a layer that is substantially identical to layer 66. The thin film substituting for etch stop 66 can be chosen so as to be unaffected by the etch used to pattern bottom surface 62, and thus corrugations will be produced which are substantially the same as corrugations 68 shown in FIG. 5D. Thus, the materials used to form corrugations 68 are not limited to that of the semiconductor substrate 58. Such other materials are useful in various applications where their different material properties can be advantageously used to impart desirable characteristics to the deflection of central deflecting member 76.

The processes of the present invention have several advantages over prior art processes. First, since etch stop 66 is provided on a top surface of the wafer, the corrugations can be of any configuration. For example, as shown in FIG. 5D, corrugations 68 are rounded, thereby obviating much of the stress inherent in prior art trapezoidal corrugations.

Second, etch stop 66 also obviates the front-to-back alignment problem. Etch stop 66 controls not only the desired depth of the corrugations, but also the contour of the region. As mentioned before, the corrugations formed by prior art methods require precise alignment between the front and back. With the method of the present invention, there is no alignment problem. This allows efficient, cost-effective fabrication of corrugations using semiconductor or other materials of various paths such as spirals, serpentines, radials, and the like.

Third, in the method of the present invention, the thickness of the corrugations is independent of the thickness of the deflecting member. Thus, the thickness of either member is not limited by the other.

Fourth, the use of etch stop 66 produces a diaphragm or like member of substantially constant thickness, regardless of the shape of the countour. This reduces the concentration of stress in the diaphragm or like member due to thickness variations and thus increases the travel distance of the diaphragm.

Fifth, it will be recognized that the process of patterning, and/or etching, and/or the formation of etch stop regions on surface 60 can be repeated to form more complicated structures. It is well known in the field of corrugated metal diaphragms that deepr edge beads, i.e. outside supports, provide improved diaphragm response in some situations. This can be provided within the scope of the present invention by a pair of masking and etching steps before the inclusion of etch stop 66. Similarly, it is often advantageous to provide thicker or thinner support regions in or around corrugations 68. This can be provided within the scope of the present invention by providing a plurality of etch stops, each formed by a separate masking and deposition step. Since these etch stop regions are defined by the location of masking layers similar to layer 70 on surface 60 and not by the possible crystalline nature of layer 58, these support regions can be provided in a variety of configurations, including rectangular, circular, annular, spiral, radial, and serpentine. Thus, for example, central deflecting member 76 can be provided by the inclusion of a deeper etch stop region interior to corrugations 68. Similarly, thicker etch stop regions between corrugations 68 and support member 78 can be provided to control the concentration of stress between these structures.

Accordingly, for the above-mentioned reasons, the present invention has significant advantages over prior art transducers, actuators, and methods of producing same.

Figure 6:
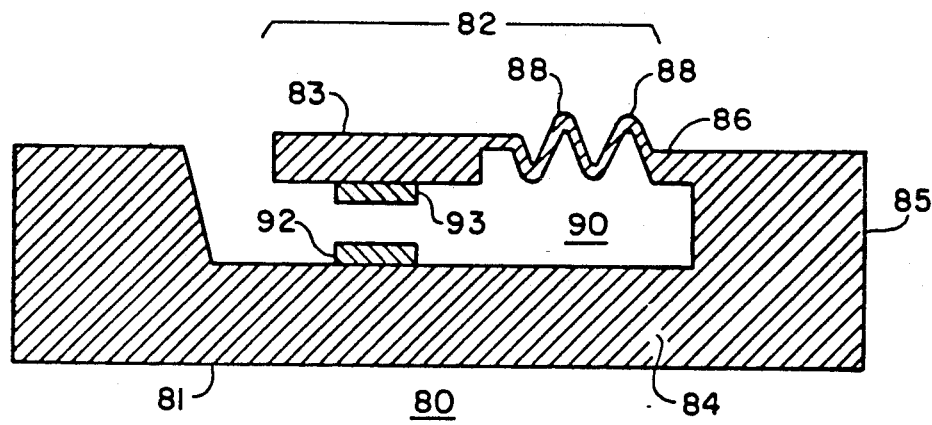
FIG. 6 is a cross-sectional side view of a beam semiconductor transducer in accordance with the present invention.

Although this invention has been described primarily with regard to a diaphragm structure, it is understood that the advantages of increasing the vertical travel and range of linearity provided by corrugations can be applied to other structures. FIG. 6 is a cross-sectional side view of a transducer 80 that utilizes a bending member 82.

In FIG. 6, semiconductor transducer 80 includes a substrate 84 which is coupled to a bending member 82. Substrate 84 includes a bottom section 81 and an upwardly extending section 85 coupled to one end of bottom section 81. Bending member 82 comprises a beam member 83, a support member 86 and a plurality of corrugations 88 coupled therebetween. Substrate 84 has a well 90 disposed in bottom section 81. Beam member 83 is suspended in a longitudinal direction over well 90. Disposed in well 90 on a first surface of substrate 84 is well sensing element 92. Attached to a first surface of beam member 83 and opposite sensing element 92 is beam sensing element 93.

Beam member 83, because of corrugations 88, is capable of increased travel per unit of applied force compared with prior art flat beams. Hence, transducer 80 has the same advantages as those described in conjunction with transducer 30 of FIGS. 3 and 4. It is understood that bending member 82 can also be made of other materials such as described previously for the diaphragm transducer and will have certain desirable characteristics according to the material chosen.

The above descriptions are made primarily with regard to transducers, but it is understood that the present invention also comprises other devices such as actuators.

Figure 7:
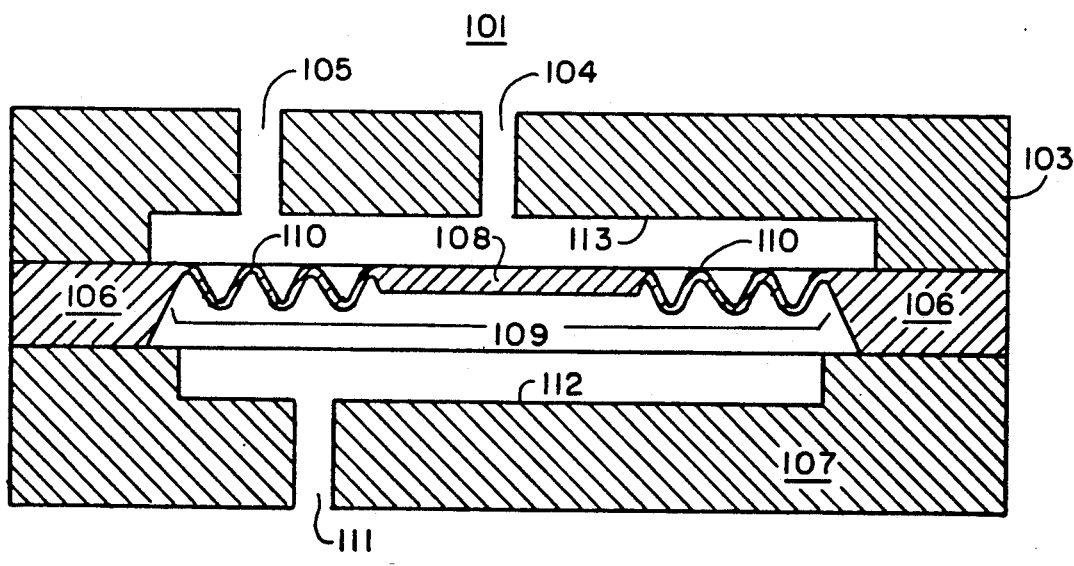
FIG. 7 is a cross-sectional side view of a diaphragm semiconductor actuator in accordance with the present invention.

FIG. 7 is a cross-sectional side view of an acutator 101 utilizing a corrugated diaphragm structure 109 according to the present invention. Diaphragm 109 includes a deflecting member 108 attached to a support member 106 via corrugations 110. A substrate 107 having an aperture 111 and a substrate well 112 is attached to support member 106. Attached to the opposite side of support member 106 is a superstrate 103 having apertures 104 and 105 and a superstrate well 113. Diaphragm 109 can be constructed from silicon or from other materials such as described previously for the diaphragm transducer and will have certain desirable characteristics according to the material chosen.

In operation, application of a control pressure through aperture 111 to substrate well 112 causes deflecting member 108 to move. A flow of fluid through aperture 104 to superstrate well 113 and back through aperture 105 can be controlled by the displacement of deflecting member 108 which itself is controlled by the control pressure in substrate well 112. Thus actuator 101 can operate, for example, as a valve.

Actuator 101 thus has an advantage over prior art flat diaphragm actuators in that there is a larger vertical travel displacement and a greater linear response range of diaphragm 109 due to corrugations 110. This allows the actuator of the present invention to be more accurate, more sensitive, and much smaller than prior art actuators.

In summary, it has ben shown that the transducers and actuators of the present invention have significant advantages over prior art transducers and actuators. Also, the method of manufacture of the present invention produces reliable, easy to manufacture, more easily controllable, and less costly transducers and actuators than prior art devices.

Although the present invention has been described in accordance with specific illustrative embodiments, one of ordinary skill in the art will recognize that a variety of modifications can be made to these embodiments and such modifications are within the spirit and scope of the present invention. The scope of the present invention is defined, therefore, solely by the scope of the following claims.

What is claimed is:

1. A method for forming at least one corrugation in a semiconductor material comprising the steps of:
   (a) masking a first surface of said semiconductor material in accordance with a predetermined pattern;
   (b) etching said first surface in accordance with said predetermined pattern to provide a predetermined profile on said first surface;
   (c) removing said mask from said first surface;
   (d) providing an etch stop on said surface in accordance with said predetermined profile; and
   (e) etching second surface that is opposite said first surface to said etch stop to form said corrugation.

2. The method of claim 1 further comprising the step of providing a mask on said second surface after said etch stop is provided to form a support member.

3. The method of claim 1 wherein step (a) comprises oxidizing said semiconductor material.

4. The method of claim 1 wherein step (b) comprises etching said semiconductor material with a plasma etchant.

5. The method of claim 1 wherein step (d) comprises diffusing an etch stop in said material to a depth of between 0.3 $\mu$m and 20 $\mu$m.

6. The method of claim 1 wherein step (d) comprises diffusing an etch stop in said material to a depth determined by the depth of a diffused semiconductor dopant.

7. The method of claim 1 wherein step (d) comprises the deposition of a thin film material conforming to said predetermined profile, said thin film material being unreactive with said second surface etching of step (e).

8. The method of claim 7 wherein said thin film material is selected from the group consisting of sputtered metal film, evaporated metal film, plated metal film vapor deposited dielectric film, and polymer coating.

9. The method of claim 1 wherein step (d) comprises forming said deflecting member and said corrugations from the group consisting of sputtered metal, evaported metal, plated metal, vapor deposited dielectric, and polymers.

10. The method of claim 1 wherein step (e) comprises anisotropically etching said opposite surface.

11. The method of claim 1 wherein step (e) comprises isotropically etching said opposite surface.

12. The method of claim 1 in which said etch stop includes etching with a material selected from the group consisting of boron, phosphorous, arsenic, antimony or aluminum.

13. A method for forming from a semiconductor material a semiconductor transducer having a deflecting member supported by at least one corrugation, comprising the steps of:
   (a) masking a first surface on said semiconductor material in accordance with a first predetermined pattern;
   (b) masking a second surface on said semiconductor material in accordance with a second predetermined pattern;
   (c) etching said first surface in accordance with said predetermined pattern to provide a predetermined profile on said first surface;
   (d) removing said mask from said first surface;
   (e) providing an etch stop on said first surface in accordance with said predetermined profile; and
   (f) etching the unmasked portion of said second surface to form said corrugaton and said deflecting member.

14. The method of claim 13 further comprising the step of providing a mask on said second surface after said etch stop is provided to form a support member thereon.

15. The method of claim 13 wherein step (a) comprises oxidizing said oxidizing said semiconductor material.

16. The method of claim 13 wherein step (b) comprises etching said semiconductor material with a plasma etchant.

17. The method of claim 13 in which step (d) comprises diffusing an etch stop in said material to a depth of between 0.3 $\mu$m and 20 $\mu$m.

18. The method of claim 13 wherein step (e) comprises diffusing an etch stop in said material to a depth determined by the depth of a diffused semiconductor dopant.

19. The method of claim 13 wherein step (e) comprises the deposition of a thin film material conforming to said predetermined profile, said thin film material being unreactive with said second surface etching of step (f).

20. The method of claim 19 wherein said thin film material is selected from the group consisting of sputtered metal film, evaporated metal film, plated metal film, vapor deposited dielectric film, and polymer coating.

21. The method of claim 13 wherein said (e) comprises forming said deflecting member and said corrugations from the group consisting of sputtered metal, evaporated metal, plated metal, vapor deposited dielectric, and polymers.

22. The method of claim 13 in which step (f) comprises anisotropically etching said second surface.

23. The method of claim 13 wherein step (f) comprises isotropically etching said second surface.

24. The method of claim 13 in which said etch stop includes boron.

25. A method for forming a semiconductor structure having a deflector member supported by one or more corrugations, comprisng the steps of:

(a) etching a first surface of a semiconductor material in accordance with one or more predetermined patterns to provide a predetermined profile on said first surface;

(b) providing one or more etch stop features on said first surface in accordance with said predetermined profile and in accordance with one or more predetermined patterns; and (c) etching a second surface of said semiconductor material in accordance with another predetermined pattern to form said corrugations and said deflecting member.

* * * * *

UNITED STATES PATENT AND TRADEMARK OFFICE
CERTIFICATE OF CORRECTION

PATENT NO. : 5,116,457
DATED : May 26, 1992
INVENTOR(S) : John H. Jerman

It is certified that error appears in the above-indentified patent and that said Letters Patent is hereby corrected as shown below:

At column 3, line 15, change "produces" to --produced--.

At column 5, line 19, change "device" to --devices--. At column 5, lines 22-23, change "trnasducer" to --transducer--.

At column 8, lines 3-4, change "operability" to --inoperability--.

At column 9, line 15, change "corrugation" to --corrugations--.

At column 9, line 65, change "countour" to --contour--.

At column 10, line 5, change "deepr" to --deeper--.

At column 11, line 51 (Claim 1), after "etching" insert --a--.

UNITED STATES PATENT AND TRADEMARK OFFICE
CERTIFICATE OF CORRECTION

PATENT NO. : 5,116,457
DATED : May 26, 1992
INVENTOR(S) : John H. Jerman

It is certified that error appears in the above-indentified patent and that said Letters Patent is hereby corrected as shown below:

At column 12, line 5 (Claim 8), after "film" (third occurrence) insert --,--.

At column 12, line 9 (Claim 9), change "evaported" to --evaporated--.

At column 12, line 44 (Claim 15), delete "oxidizing said" (second occurrence).

At column 13, line 12 (Claim 15), change "deflector" to --deflecting--.

At column 13, line 13 (Claim 25), change "comprisng" to --comprising--.

Signed and Sealed this

Fourteenth Day of September, 1993

Attest:

BRUCE LEHMAN

*Attesting Officer*   *Commissioner of Patents and Trademarks*